United States Patent
Misra et al.

(10) Patent No.: US 7,783,798 B1
(45) Date of Patent: Aug. 24, 2010

(54) SYSTEM AND METHOD FOR MANAGING USE OF AVAILABLE BANDWIDTH FOR A LINK USED FOR MOVEMENT OF DATA BEING COPIED IN A DATA STORAGE ENVIRONMENT

(75) Inventors: Pawan Misra, Morrisville, NC (US); Michael D. Haynes, Raleigh, NC (US); Walter A. O'Brien, III, Westborough, MA (US)

(73) Assignee: EMC Corporation, Hopkinton, MA (US)

( * ) Notice: Subject to any disclaimer, the term of this patent is extended or adjusted under 35 U.S.C. 154(b) by 320 days.

(21) Appl. No.: 10/877,152

(22) Filed: Jun. 25, 2004

(51) Int. Cl.
*G06F 3/00* (2006.01)

(52) U.S. Cl. .................... 710/60; 711/162; 711/170

(58) Field of Classification Search .......... 710/60; 711/162, 170; 370/233, 235
See application file for complete search history.

(56) References Cited

U.S. PATENT DOCUMENTS

| | | | | |
|---|---|---|---|---|
| 5,050,161 A | * | 9/1991 | Golestani | 370/230 |
| 5,901,327 A | * | 5/1999 | Ofek | 710/5 |
| 6,044,444 A | * | 3/2000 | Ofek | 711/162 |
| 6,108,748 A | * | 8/2000 | Ofek et al. | 711/112 |
| 6,385,673 B1 | * | 5/2002 | DeMoney | 710/60 |
| 6,574,718 B2 | * | 6/2003 | Sutherland et al. | 711/159 |
| 6,711,137 B1 | * | 3/2004 | Klassen et al. | 370/252 |
| 6,779,093 B1 | * | 8/2004 | Gupta | 711/162 |
| 6,907,481 B2 | * | 6/2005 | Kovacevic | 710/60 |
| 6,973,555 B2 | * | 12/2005 | Fujiwara et al. | 711/170 |
| 7,024,528 B2 | * | 4/2006 | LeCrone et al. | 711/162 |
| 7,133,907 B2 | * | 11/2006 | Carlson et al. | 709/220 |
| 7,185,228 B2 | * | 2/2007 | Achiwa | 714/20 |
| 7,278,049 B2 | * | 10/2007 | Bartfai et al. | 714/6 |
| 7,299,332 B1 | * | 11/2007 | Misra et al. | 711/170 |
| 7,386,694 B1 | * | 6/2008 | Bezbaruah et al. | 711/162 |
| 2003/0185154 A1 | * | 10/2003 | Mullendore et al. | 370/230 |
| 2004/0205312 A1 | * | 10/2004 | Zlotnick et al. | 711/162 |
| 2004/0250032 A1 | * | 12/2004 | Ji et al. | 711/162 |
| 2005/0050287 A1 | * | 3/2005 | Boyd et al. | 711/162 |

* cited by examiner

*Primary Examiner*—Niketa I Patel
*Assistant Examiner*—Ernest Unelus
(74) *Attorney, Agent, or Firm*—Krishnendu Gupta; Joseph D'Angelo

(57) ABSTRACT

This invention is a system and method for managing the use of available bandwidth for a link used for movement of data being copied in a data storage environment.

15 Claims, 9 Drawing Sheets

| TYPE OF LINK | APPROXIMATE BANDWIDTH (KBytes/sec) | LATENCY (Msec) | LINE CAPACITY (KBytes) | BUFFER SIZE X BUFFER COUNT |
|---|---|---|---|---|
| T1 | 150 | 50 | 7.5 | 64K x 3 |
| T1 | 150 | 1 | 0.15 | 64K x 3 |
| T3 | 5500 | 50 | 275 | 64K x 10 |
| T3 | 5500 | 1 | 5.5 | 64K x 3 |
| FAST ETHERNET | 12500 | 50 | 625 | 64K x 20 |
| FAST ETHERNET | 12500 | 1 | 12.5 | 64K x 3 |
| OC3 | 19300 | 50 | 965 | 512K x 4 |
| OC3 | 19300 | 1 | 19.3 | 512K x 4 |
| SAN (2GBit) | 200000 | 50 | 10000 | 512K x 4 |
| SAN (2GBit) | 200000 | 1 | 200 | 512K x 4 |

118 LOW BANDWIDTH
120 HIGH BANDWIDTH

SYSTEM AND METHOD FOR MANAGING USE OF AVAILABLE BANDWIDTH FOR A LINK USED FOR MOVEMENT OF DATA BEING COPIED IN A DATA STORAGE ENVIRONMENT

RELATED APPLICATION

This Application is related to U.S. patent application Ser. No. 10/877,647 filed on even date with the present U.S. Patent Application and entitled "System and Method for Allocating Memory Resources Used For Movement of Data Being Copied in a Data Storage Environment." and assigned to EMC Corporation the assignee of this Application.

A portion of the disclosure of this patent document contains command formats and other computer language listings, all of which are subject to copyright protection. The copyright owner, EMC Corporation, has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This application generally relates to data storage management, and more particularly to managing the use of available bandwidth for a link used for movement of data being copied in a data storage environment.

BACKGROUND

Computer systems may include different resources used by one or more host processors. Resources and host processors in a computer system may be interconnected by one or more communication connections. These resources may include, for example, data storage systems, such as the Symmetrix™ or Clariion™ family of data storage systems manufactured by EMC Corporation. These data storage systems may be coupled to one or more host processors and provide storage services to each host processor. An example data storage system may include one or more data storage devices, such as those of the Symmetrix™ family, that are connected together and may be used to provide common data storage for one or more host processors in a computer system.

A host processor may perform a variety of data processing tasks and operations using the data storage system. For example, a host processor may perform basic system I/O operations in connection with data requests such as data read and write operations. Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units. The logical disk units neither may or may nor correspond to the actual disk drives. Allowing multiple host systems to access the single storage device unit allows the host systems to share data stored therein.

It is desirable to copy or replicate data for a variety of different reasons, such as, for example, database-related data may be critical to a business so it is important to make sure it is not lost due to problems with the computer systems, such as for example, loss of electrical power. However, there are costs associated with backing up or otherwise copying or replicating data. Such costs include the data being unavailable to an application that may require access to it. For example, in a normal business operation, not as a production environment, data may be needed for an update or in relation to a transaction on a close to full-time (i.e. 24 hours a day, 7 days a week) basis. Another cost is that associated with bandwidth available for a link over which data is transferred during copying and replication. What is needed is a low-cost simple way to manage efficient use of bandwidth in a data storage environment and in particular one that supports such copying and replication as that described above.

SUMMARY OF THE INVENTION

To overcome the problems of the prior art mentioned above and to provide advantages also described above, this invention is a system and method for managing for efficient use of available bandwidth for a link used for movement of data being copied in a data storage environment. In one embodiment, a methodology is provided that manages use of the link's available bandwidth. In other embodiments, implementations include a system, a computer program product, or an apparatus, wherein each embodiment is configured for carrying out the steps involved in the methodology.

BRIEF DESCRIPTION OF THE DRAWING

The above and further advantages of the present invention may be better under stood by referring to the following description taken into conjunction with the accompanying drawings in which.

DETAILED DESCRIPTION OF THE PREFERRED EMBODIMENTS

Introduction

Figure 1:
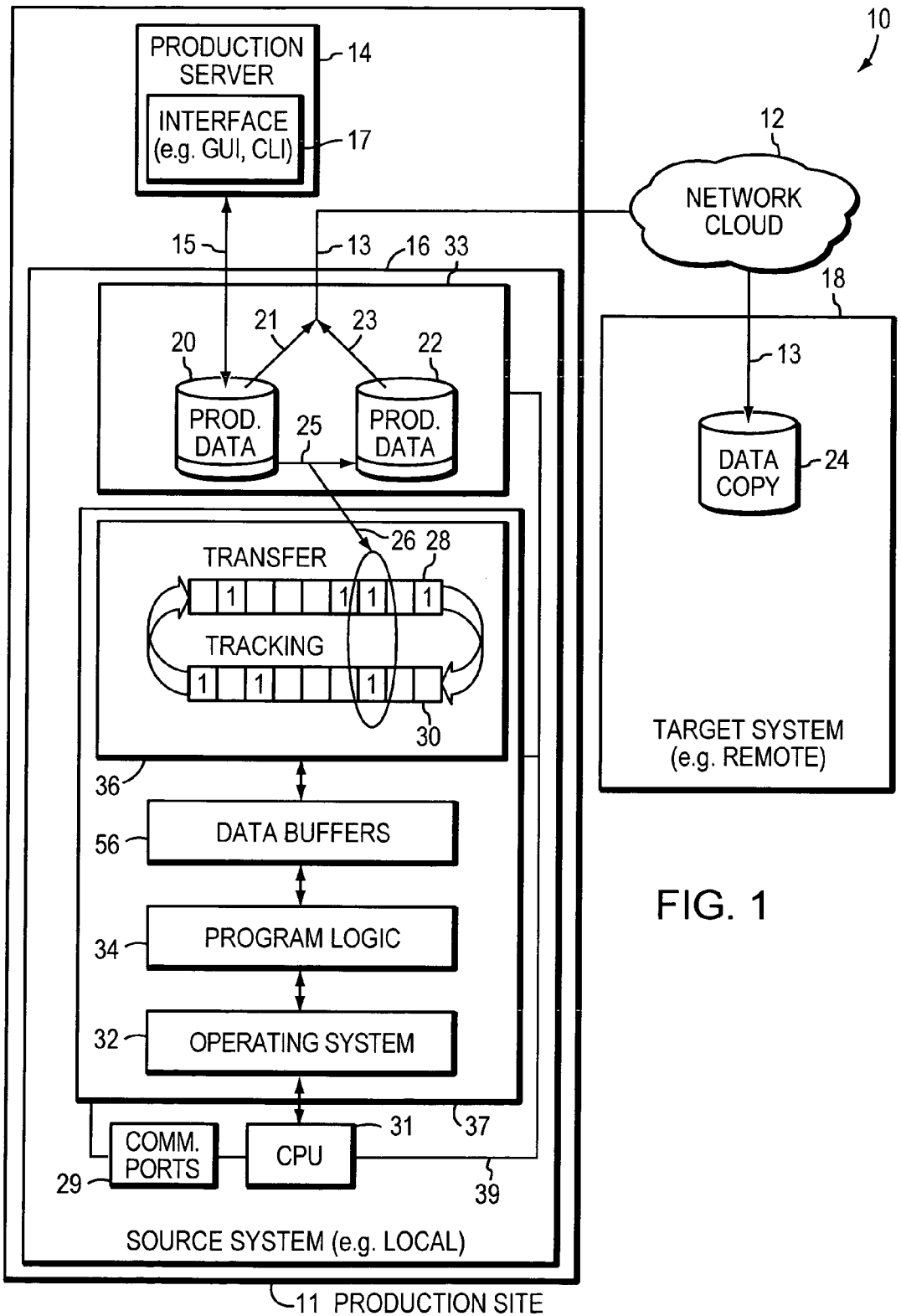
FIG. 1 shows a block diagram schematic of an embodiment of a data storage environment including one or more data storage systems and including a Production Site and further including program logic for carrying out the method embodiments of the present invention.

In the preferred embodiment, the preferred invention operates in cooperation and may be a part of computer software, such EMC Corporation's SAN Copy software. SAN Copy is configured for allowing central manage movement of data between data storage systems, e.g. the preferred EMC CLARiiON and Symmetrix storage systems available from EMC Corporation of Hopkinton, Mass., although one skilled in the art will recognize that the invention may be used with other data storage systems. Preferably, SAN Copy is a storage-based implementation to remove impact from a server which may be hosting application software in a production environment.

Typically, SAN Copy operates in cooperation, with EMC's TimeFinder and SnapView local replication applications, eliminating the impact to production activities by using Business Continuance Volumes (BCV's) (discussed in the incorporated '497 patent referenced below) or Snapshots as source volumes so applications stay online throughout the data movement process. However, the present invention may be used without requirement of such BCV's or Snapshots. For the sake of completeness, operational features embodied in EMC's Timefinder and Symmetrix are described in U.S. Pat. No. 6,101,497 issued Aug. 8, 2000, and also in U.S. Pat. No. 5,206,939 issued Apr. 27, 1993, each of which is assigned to EMC the assignee of this invention and each of which is hereby incorporated by reference. Consequently, the following discussion makes only general references to the operation of such systems.

SAN Copy is an embodiment of an array to array copy technology and can also copy within the array itself. Data is transferred from a source array to a remote destination array with no attached server involvement pertaining to the data movement (strictly storage array to array data communication). Incremental SAN Copy is an enhancement to the SAN Copy product offered by EMC Corporation which allows customers to update data on remote arrays by sending only the modified data since the last time an incremental update had occurred.

Snapview is other software available from EMC Corporation and which embodies important features of the present invention. SnapView embodies the invention which supports an incremental copy feature, by employing a session as a tracking mechanism to track the changes for an Incremental Copy Session and to maintain the consistency of a changing data image during the life of the data copy. The inventors have critically recognized that such a mechanism may be employed to advantageously minimize the performance impact of accessing production data for copying or replication.

With regard to some terminology in this application, it will be helpful to discuss some terms, shown in Table 1.

TABLE 1

| Terminology | |
|---|---|
| COFW: | copy on first write. Mechanism for maintaining a pointer based point in time copy of data. The COFW policy insures the original version of data is saved before allowing the data to be modified. |
| Incremental SAN Copy (ISC): | a feature that provides users with the ability to perform incremental updates to copies of their production data. These copies can reside on the same array as the production data, or on remote arrays. The data transfer is array-to-array without server involvement. ISC is an extension to the SAN Copy product. |
| Incremental SnapView Session: | a special SnapView Session that is created specifically for an ISC Session. These sessions are used to track which data areas of the source data are modified as well as protect the user selected point-in-time copy of the data while an incremental copy is in progress. |
| Delta Bitmap: | data structure in SnapView that is used to track changes in granularities between 2KB and 64KB for an incremental SnapView session. The delta bitmap consists of two parts. Tracking Bitmap - part of the delta bitmap that is currently tracking changes. The changes that are tracked do not result in a COFW. Transfer Bitmap - part of the delta bitmap that is used by the Incremental SnapView Session to provide SAN Copy with the data to be copied. It represents the changes from the last copy operation to the most recent "mark" operation. |
| Chunk: | A chunk is a contiguous piece of data, which will be returned by Snapview in a GetNext buffer. Several chunks could be returned in a GetNext buffer. |
| GetNext: | This is a private interface between SAN Copy and SnapView to read the data |
| Available Link Bandwidth (BW): | This is the bandwidth available to SAN Copy for a given session. It is specified by the user and may be less than the actual bandwidth of the link. |
| Effective Bandwidth: | This is the bandwidth that a SAN Copy Session is utilizing. |
| High Bandwidth Line: | For the purpose of this document a specified bandwidth that is equal to or greater that the bandwidth of an OC3 line is considered a high bandwidth line. |
| Low Latency: | For the purpose of this document latency of 1 msec or less is considered a low latency. |
| Link Latency (LL): | This is the amount of time it takes to transmit a block of data to its destination. |
| Line Capacity (Lcap): | This is the amount of data required to completely fill a line end to end for a given bandwidth and latency. Line Capacity = Available Link Bandwidth * Link Latency |
| Granularity: | This is the chunk size of the changes being tracked on the source LU. |
| Buffer Space: | This is the total amount of memory allocated to hold the Getnext data. Buffer Space = Buffer Size * Buffer Count. |

Overview of a Preferred Embodiment

In a preferred embodiment, Program Logic cooperates with and may include EMC Incremental SAN Copy features that use the EMC SAN Copy and EMC SnapView program code and may also receive instructions from users through the GUI or CLI, or through dynamically linked other programs. One skilled in the art will recognize that the invention is not limited to such preferred embodiments; however, they are described herein as an example of implementing the invention. Returning to an exemplary embodiment overview, the user can specify the point-in-time copy of the data to be transferred to the remote arrays by "marking" the data via an administrative command. Any time after the data has been "marked"; the user can initiate the SAN Copy transfer of the data to one or more remote arrays. After an initial full copy, subsequent copies will only copy portions of the production data that changed since the previous copy. Preferably, the communication and user input is provided by using some type of Administration program, e.g. EMC's Navisphere CLI or GUI product.

Preferred Embodiment Description

Referring to FIG. 1, Data Storage Environment 10 includes a Production Server 14 with an Interface 17 (e.g. a graphical user interface a.k.a. GUI or command line interface a.k.a. CLI) for communicating with Local Data Storage System 16 across path 15, and in particular for accessing Production Data 20, wherein Production Data Copy 22 is typically COFW data made for consistency and indicated along copy path 25, and wherein tracking actions along path 26 will be discussed below. The Production Data 20 is updated by write requests along path 15 in Server I/O, which results in regions of modified storage tracked by a tracking session 36. An incremental tracking session 36 on the Data Storage System 16 supports an incremental copy feature, such as the preferred Incremental SAN Copy feature available from EMC Corporation. For convenience, reference is made herein to a Production Site 11, which comprises the Production Server 14 and Local System 16.

The Data Storage System 16 may be considered a Source or Local system and replication, backup, or other copying may be performed to a Target or Remote system. The term remote as used herein means being on a different storage system, although this invention is applicable to source and target systems that actually are the same system but the data is sent to a different storage device or even a different location on the same storage device in the same system. For purposes of this invention it is sufficient to understand that the Remote System has storage devices (e.g. hard drives) that may function to duplicate or simulate some or all of the Local System on a volume-by-volume basis and that the volumes can be physical volumes, although logical volumes are preferred. Devices and volumes in a logical sense are also used interchangeably throughout. Note also that throughout this document, like symbols and identical numbers represent like and identical elements in the Figures. With further regard to terminology, copying is used throughout to generally refer to any way of duplicating data that is stored in one storage location (e.g. Production Data on the Source or Local System) to another storage location (e.g. Data Copy on the Target or Remote System) for any reason including, replication, backup, restore, or general mirroring. Although the invention is particularly useful in an environment employing a local and remote data storage system, it will become apparent upon reading this specification that the invention is also useful in a local system itself using copying or replication to a local volume.

Generally, such a data storage system as those described herein includes a system memory and sets or pluralities of multiple data storage devices. The system memory can comprise a buffer or cache memory; the storage devices in the pluralities can comprise disk storage devices, optical storage devices and the like. However, in a preferred embodiment the storage devices are disk storage devices. The sets represent an array of storage devices in any of a variety of known configurations. In such a data storage system, a computer or host adapter provides communications between a host system and the system memory and disk adapters and provides pathways between the system memory and the storage device pluralities. Regarding terminology related to the preferred data storage system, the host or host network is sometimes referred to as the front end and from the disk adapters toward the disks is sometimes referred to as the back end, and ports communicating from a data storage system toward each respective end are termed, respectively, front end ports and back end ports. Also disks may be addressed logically using logical volumes also known as logical units also interchangeably referred to many who are skilled in the data storage computer arts as either LU's or LUN's, wherein the LU's or LUN's represent volumes of physical data on data storage devices such as disks. Mapping is used between such LUN's and physical data to achieve the representation. A bus interconnects the system memory, and communications with front and back end.

In a preferred embodiment the tracking session 36 is part of EMC's SAN COPY or Snapview product, or follow on products including Mirrorview and Mirrorview Asynchronous (also known as Mirrorview-A) and preferably includes: (1) maintenance of two data structures, which for purposes of simple explanation are shown as bitmaps (but one skilled in the art will recognize that the invention is not limited to a specific data structure such as bitmaps), transfer bitmap 28 and tracking bitmap 30 for tracking incremental changes to the production data (the roles of the transfer and tracking bitmaps switch whenever a session is marked); (2) the ability to mark and unmark a point in time associated with a session; (3) reduced COFW overhead on access to Production Data 20 and 22, preferably in non-volatile memory 33, such as a computer hard drive, including: (a) No COFWs unless the session is marked; (b) COFWs only occur if the data had been marked to be copied in the transfer bitmap; and (c) the probability of having to perform a COFW diminishes while an ISC is in progress.

Generally, in a preferred embodiment the two bitmaps are used by the Program Logic 34 in cooperation with the operating system 32, and the CPU 31 on the source data storage system 16. The bitmaps and Program logic operate in electronic memory 37 and when executed by CPU 31 over communication path 39 carry out method steps embodying the invention. It is preferred that the Program Logic be computer software although it may be possible for some or all of it to be embodied in hardware or firmware. The Program Logic 34 (FIGS. 1 and 10) in a preferred embodiment encompasses at least in part the integration of EMC's Snapview with Incremental SAN Copy and further with EMC's Mirrorview-Asynchronous product, each available from EMC of Hopkinton, Mass., USA. Data protected by this mechanism may span storage processors in the storage array.

Figure 10:
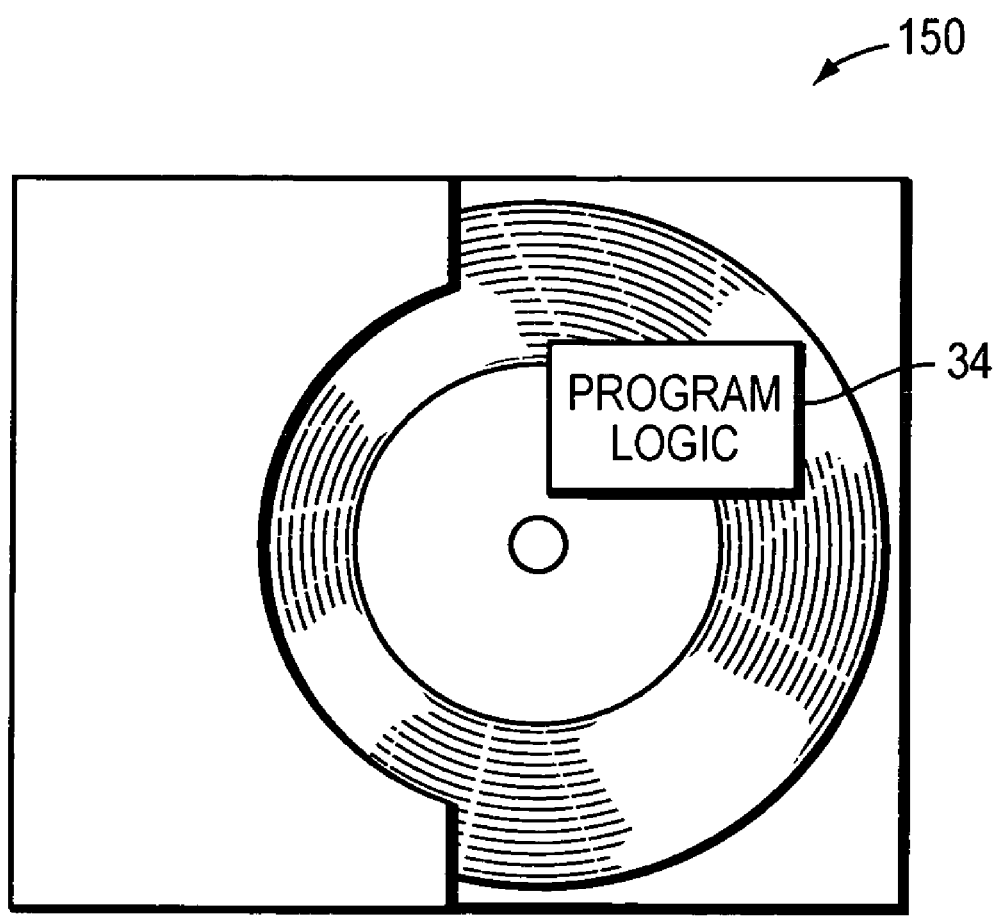
FIG. 10 shows a computer-readable medium including computer-executable code including at least some of the program logic of FIG. 1 for carrying out method steps of the method embodiments of the present invention.

Program Logic 34 may also be embodied on a computer-readable medium 150 as shown in FIG. 10, and wherein the Logic is encoded in computer-executable code configured for carrying out steps of a method embodiment of this invention. The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission. It may be implemented such that herein, when the program code is received and loaded into and executed by a machine, such as a computer, the machine becomes an apparatus for practicing the invention. When implemented on one or more general-purpose processors, the program code combines with such a processor to provide a unique apparatus that operates analogously to specific logic circuits.

Preferably, during the life of an Incremental Session, these two bitmaps swap their roles after a mark operation. After a session is marked, a COFW will be performed only if the transfer bitmap (which was the tracking bitmap before the mark) indicates that the specific region of the data is yet to be copied via ISC. Further, as the data is copied, the regions corresponding to the data transferred in the transfer bitmap are cleared which further reduces the amount of COFW activity needed. As the transfer proceeds, the probability of having to perform a COFW diminishes. These optimizations may significantly reduce the number of COFWs necessary to maintain a consistent copy of the production data and are an improvement of prior art systems that may include known pointer-based snapshot technologies.

Referring again to FIG. 1, Production Data 20, as it pertains to this invention, exists in two states: marked and unmarked. All write requests to Production Data, that has an incremental session associated with it, are tracked (i.e., records of regions on the storage where the change occurred is maintained in the tracking bitmap). Prior to making an incremental copy to Data Copy 24 on a Target or Remote Data Storage System or Storage Array 18, over a network cloud 12, which may be for example a wide area network, the state of the data is transitioned to indicate marked. Then in a preferred embodiment, the tracking bitmap becomes the transfer bitmap and a cleared transfer bitmap is used as the tracking bitmap. Thus, the role of the tracking and transfer bitmaps will switch each time data is marked. This switching of roles should be atomic in nature with respect to Production Server 14 writes to the Production Data 20. Changes to the Production Data since the last incremental copy are copied to one or more remote arrays only when the data is in the marked state. As soon as an incremental copy is completed the state of the production data is reverted to unmarked by the Program Logic 34.

The ISC process will transfer the regions indicated in the transfer bitmap. While the production data is being transferred, new server write requests are tracked for the next transfer. If a server write request is destined to modify a region that is going to be transferred (the transfer bitmap indicates that region is to be transferred), the data at the time of the mark needs to be preserved. The preferred incremental SnapView will perform a COFW of the region before the server write request is allowed to proceed. The ISC transfer, when it gets to the region that had a COFW performed upon it, will transfer the data that has been saved via the COFW. After a region has been transferred via ISC, the region in the transfer bitmap is cleared. This will reduce the probability of having to perform a COFW as the ISC proceeds. A COFW should be performed if the region indicated in the transfer bitmap is being overwritten before the regions have been transferred to the remote array or the resultant data copy will be inconsistent. This is represented by copy path 25 indicating a COFW from Production Data 20 to Production Data Copy 22. Along Path 26, changes to the transfer and tracking bit maps indicate the state of data that may be later transferred to Data Copy 24. Along path 21 and 23, data regions marked by the transfer bit map from either the Production Data or COFW Production Data Copy are sent over path or link 13 through Network Cloud 12 to Data Copy 24 on the Target 18. One skilled in the art will recognize that the Data Copy 24 could also reside on the same array or data storage system as the Production Data, but there are advantages related to availability of data in sending it to another system.

FIG. 1 also shows data buffers 56 that are memory resources for data transfer between the source and target system that are managed by components of the program logic 34, and specifically a copy manager driver that will be discussed below in detail, and in relationship to the communication (comm.) ports 29 of the source system. The comm. ports include front end and back end ports that are also discussed herein.

Copy Manager Embodiment

Figure 2:
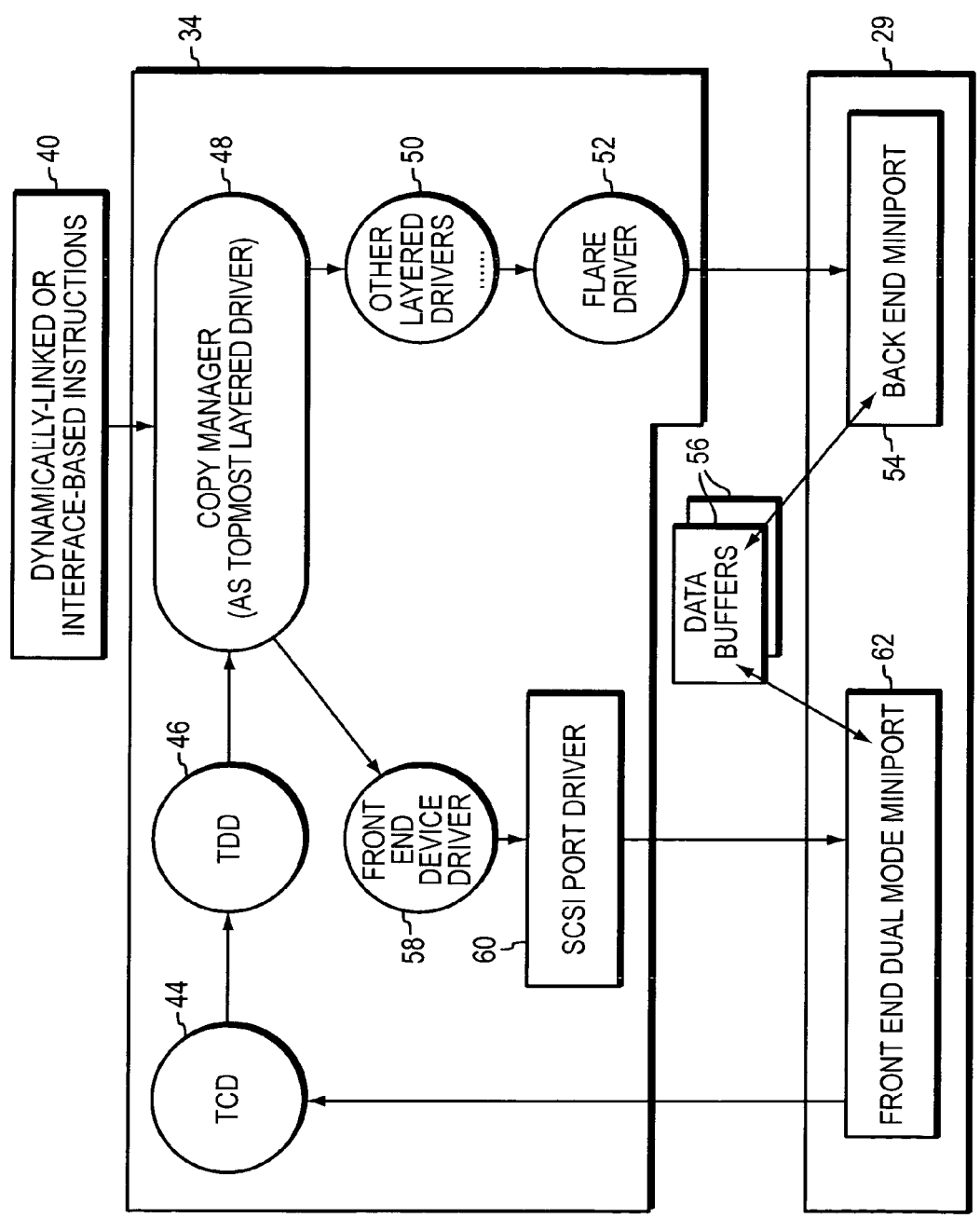
FIG. 2 shows another schematic block diagram including a depiction of functional relationships of components of the program logic of FIG. 1 and acting on data of the one or more data storage systems of FIG. 1.

Referring to FIG. 2, an embodiment of program logic 34 that includes a copy manager 48 that manages data buffers 56 that are part of memory 37 (FIG. 1) and bandwidth utilization of data transfer over link 13 for copying and replication. The Copy Manager 48, in a preferred embodiment, is part of the Program Logic software that operates in the preferred Clariion Data Storage System from EMC and operates as and communicates with software drivers that are also part of the Program Logic in the preferred Clariion. Such drivers include, in a preferred embodiment, the Target Class Driver 44 and Target Disk Driver 46 (TCD/TDD) that comprise a driver layer provides SCSI Target support in communication with the Copy Manager and the front end dual mode miniport 62 that is part of communication ports 29 (FIG. 1). These drivers handle SCSI reads and writes as well as SCSI commands (such as INQUIRY, REPORT_LUNS, and so forth).

The TCD/TDD Layer also implements support for the preferred CLARiiON functionality which provides the means of identifying what LUNs each initiator should see. This is known as LUN masking. The feature also provides for LUN mapping whereby the host visible LUN is translated to an instance-based LUN. The Copy Manager copies data between LUNs (front end or back end). The Copy Manager receives instruction from I/O controls through a DLL (not shown) or indirectly through a user interface-based instruction shown in functional block 40. One of the functions of the Copy Manager is to copy data from a source LUN to a target LUN, but this function allows the Copy Manager to be used in a new way for both resource and bandwidth management. To initiate a copy, the Copy Manager issues some number of SCSI read requests to the source LUN. On completion of each read, the Driver writes the data to the destination LUNs. The process repeats until all data is copied.

When one of the LUNs is a front end device the Driver issues I/Os by issuing SCSI reads or writes via the front end, e.g. via a fibre channel front end in a preferred embodiment. Local LUNs are accessed by sending I/O request packets down the disk driver stack, beginning with whatever driver is attached immediately below the TDD driver, i.e. the topmost layered driver 48 and other layered drivers 50 that communicate in the driver stack within the preferred operating system driver, which operates in cooperation with the Flare Driver 52 of the Clariion data storage system in a preferred embodiment.

The Copy Manager Driver fits in with a collection of Drivers as shown in FIG. 2. The front end Device Driver 58 provides support for sending initiator-mode I/O requests to the standard SCSI Port Driver 60, which in turn communicates with the front end miniport. The data buffers 56 are allocated by the Copy Manager Driver 48, and are used by the front end miniport driver 62 and backend miniport driver 54. The backend miniport DMA's data into a Flare-owned buffer and Flare copies the data into a buffer allocated by the Copy Manager Driver.

Figure 3:
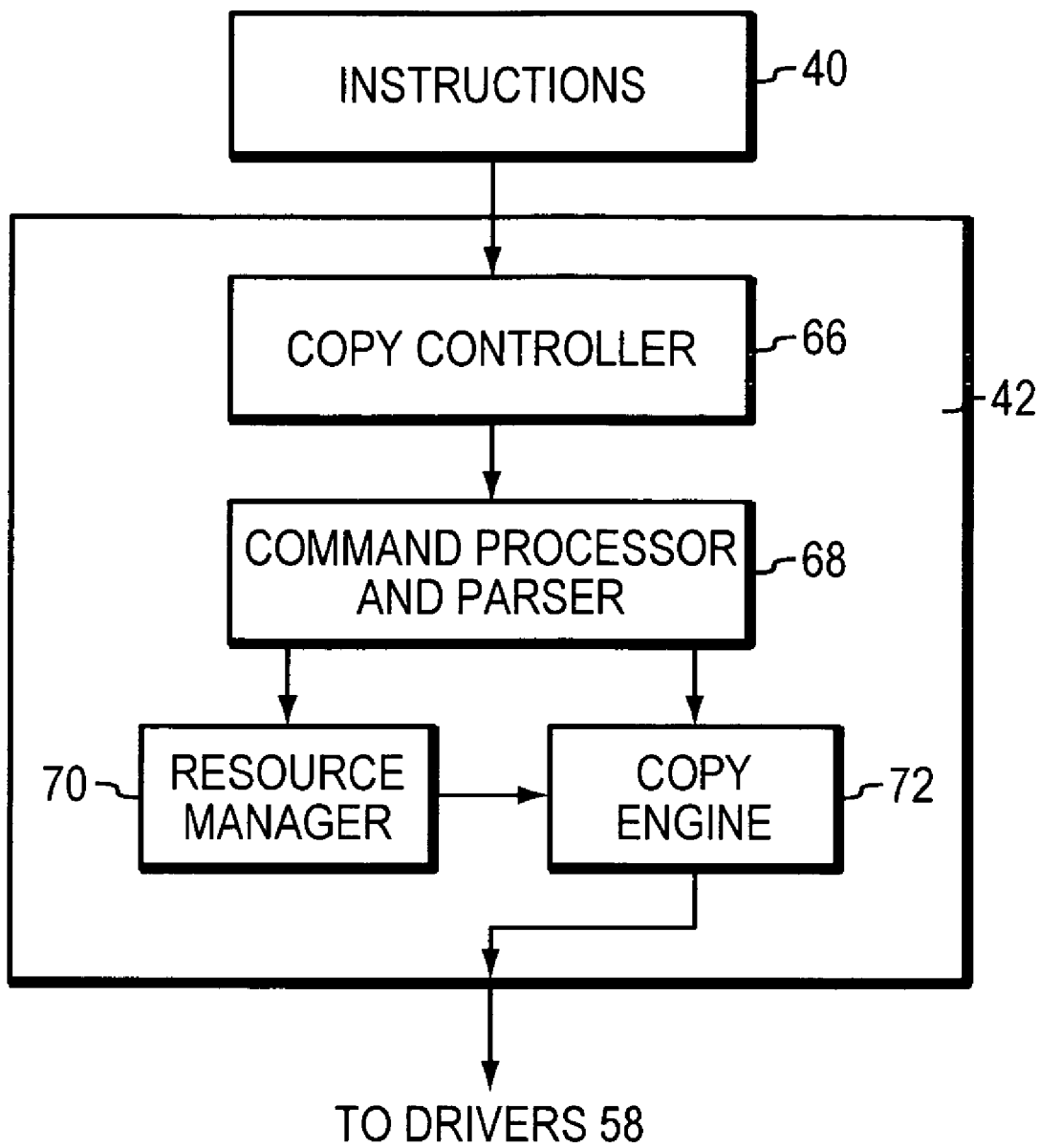
FIG. 3 shows a schematic block diagram of components of the copy manager depicted in FIG. 2.

FIG. 3 illustrates the Copy Manager Driver 42 in more detail and describes its functional components. The Copy Controller 66 has responsibility for handling incoming instructions from user space. The Copy Controller also implements the Driver Entry function, which initializes the Driver and creates the Copy Manager's device object, to which the instructions are directed. The primary control instruction of interest is the one that initiates a data copy. Additional control instructions verify access to prospective copy targets, control the operation of active copy commands, and return status. The Copy Controller preferably supports any required administrative control including those related to modifying the driver stack. It may also contain considerable portions of code related to implementation of operations such as checkpoint, pause, and resume, as convenient to the lower-level implementation.

Referring again to FIG. 3, the Copy Manager also includes a Command Processor and Parser 68. The command parser is intended to accept SCSI copy commands such as the Extended Copy Command and other Copy Commands that may be native to a particular data storage system, such as the preferred Clariion, and with the preferred SAN COPY, Snapview, and/or Mirrorview Asynchronous program code may include Complex, or Simple Copy Commands, and puts the respective commands onto one or more "streams" of input to the Command Processor. All streams can be handled simultaneously by both the Command Processor and the Copy Engine. All commands within a stream are handled in first in first out (FIFO) order. The Command Parser puts all commands associated with a single Extended Copy Command in the same stream. Complex and Simple commands can be intermixed with Extended Copy Commands, but all Commands associated with a single Extended Copy Command must be contiguous and in the same stream in the preferred embodiment. The Parser may use some intelligence in deciding which incoming commands are assigned to which stream.

The Command Processor accepts streams of Complex and Simple Copy Commands from the Command Parser. At any point in time, it is simultaneously working on all commands at the head of each stream's queue. For each new command, the Processor performs all initial setup associated with that command, such as requests to the Resource Manager 70 for buffers, establishing existence of copy targets, if necessary and conversion of any target descriptors to device objects. Several of these items involve communication with the appropriate front end Device Driver 58. In particular, the Device Drivers may create Device Objects corresponding to the Copy Targets. The Command Processor asks the appropriate front end Device Drivers to create Device Objects for use by the Copy Engine 72 in a typical Windows Operating environment.

In the preferred embodiment, local devices belong to the Flare Driver 52, so the Copy Manager must be attached to the appropriate Disk Driver stack. Attachment will be made so any Mirroring or Snap operations will be supported. The Processor will issue an upcall to the DLL to set up the stack. It will then open the Device Objects and pass the Device Object pointers to the Copy Engine as part of the Primitive Copy Command. When the Copy Engine completes a command, it returns status to the Command Processor, which performs any final cleanup and completes the request (status may include an error). Final cleanup may include additional commands to the Device Drivers.

Figure 4:
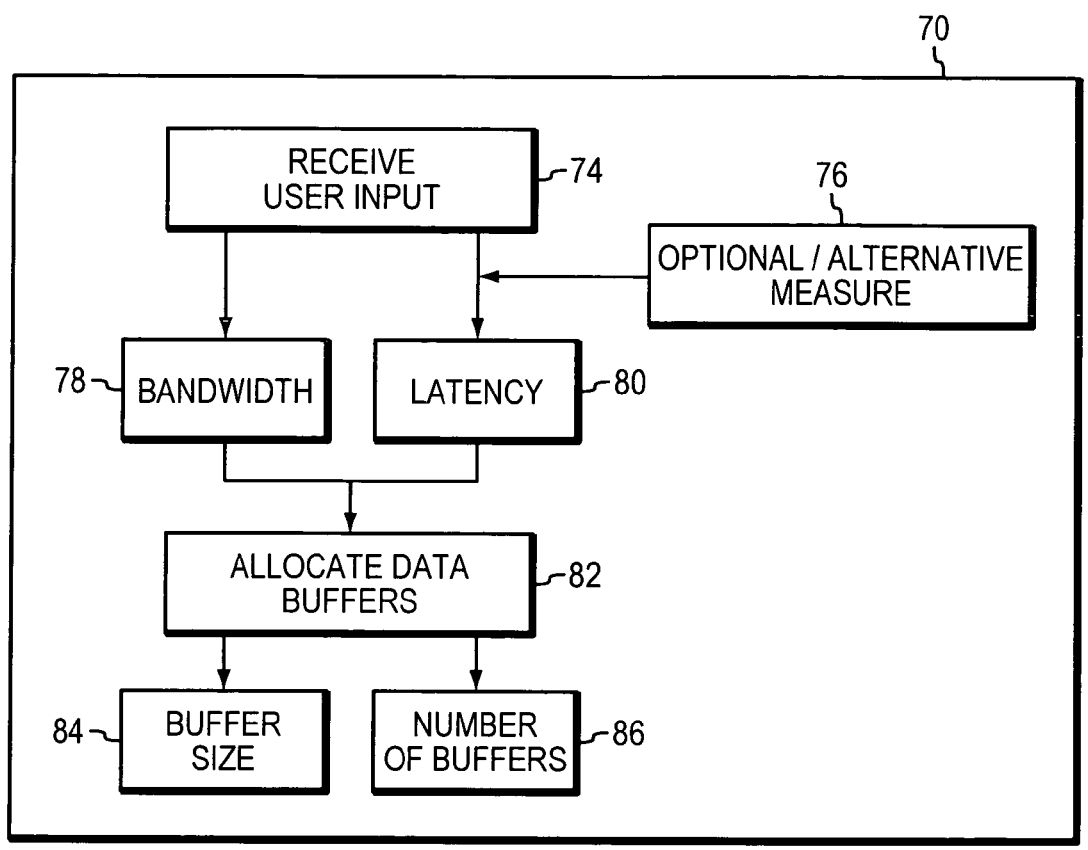
FIG. 4 shows a schematic of functions carried out by the resource manager of the copy manager depicted in FIGS. 2 and 3.

Referring to FIG. 4, the Resource Manager 70 is further described. Based on user input received in step 74, bandwidth 78 and latency 80 are provided by the DLL in a preferred embodiment. Alternatively latency may be determined for the user in step 76. The Resource Manager 70 allocates buffers to be used by the Copy Engine 72 in step 82, including Buffer size 84 and number of buffers 86.

Before sending a command to the Copy Engine, the Command Processor requests buffers from the Resource Manager. Since the Command Processor understands the characteristics of the devices involved in the copy command (generally important only for stream devices, where blocking factors may be specified in the Complex Copy Command) it must have the opportunity to specify the buffer size and maximum number of buffers. If it does not specify these parameters, the Resource Manager will choose them.

The number of buffers and buffer size and granularity of tracking determine the number of I/Os the Copy Engine can have outstanding at a time, so the Resource Manager may apply some intelligence in determining the number of buffers, to keep I/Os pipelined. It may also apply intelligence to choice of buffer size, for efficiency and throughput. Each Copy Command stream will have its own set of buffers, so the buffer manager must track them separately, and make them available to the Copy Engine on a per-stream basis. When a buffer request is made, the Resource Manager also allocates an I/O request packet (IRP) for each buffer in the preferred embodiment. The Copy Engine will use this IRP to issue Read/Write requests associated with the buffer. When the Command Processor empties a Command Stream's queue, it should notify the Buffer Manager to free all associated buffers and IRP's (the use of IRP' is incidental to operating in a Windows environment and one skilled in the art will recognize it does not limit the scope of the invention). Otherwise, the Buffer Manager will retain the buffers until a new buffer request is made for a particular stream. At that time it decides whether to reuse existing buffers and IRP's for that stream, or free them and allocate new ones.

The Copy Engine accepts Primitive Copy Commands from the Command Processor, and performs all reads and writes necessary to implement each command. The Primitive Copy Commands contain source and destination devices described as Device Objects. They may represent local devices which are part of the Disk Driver Stack. The Read/Write IRP's will be identical, whether sent to the local stack or to the Front end Device Drivers. The Copy Engine supports multiple streams of copy commands. Each stream is operated on independently, allowing individual pause, resume, and throttling. The maximum number of streams is decided at compile time and well known to both the Command Processor and Copy Engine.

The Command Processor also provides some indication to the Copy Engine as to where his buffers are located. They have been pre-allocated by the Resource Manager, through negotiation with the Command Processor. The indication of their location may simply be the Stream Number from which the Copy Engine acquired the command.

Preferably, the user shall specify the Available Bandwidth and Latency during the creation of a copy session through the GUI or CLI. The Bandwidth value is required, but the user may choose to have SAN Copy measure the latency (default behavior). These two values shall then be used to calculate and allocate an optimal amount of Buffer Space for the Session. When the Session starts, GetNext or Read will be called for all buffers. As the GetNext/Reads return, multiple writes will be issued from each buffer, up to an optimal amount of write data calculated from the Available Bandwidth and Latency values. A timer will be set and the Engine will exit.

The preferred SAN Copy has "environment variables" which allow the user to specify the Buffer Size and Count to be used for each copy. But when the Available Bandwidth and Latency are less than available in a high-bandwidth environment such as in a SAN using a Fibre Channel link, calculating a smaller buffer size and buffer count will reduce the memory consumption. A straightforward formula cannot be found for determining optimal Buffer Space, so we will approximate it by using ranges of Bandwidth and Latency, as shown in the following table. These values will be determined when a Copy Session starts, and remain in effect for the duration of the Copy, or the values could be re-calculated periodically for a more adaptive implementation. On a Fibre Channel SAN or near equivalent the SAN Copy default buffer size and count will be used. This is because it is practical for Incremental Copies on a high bandwidth, low-latency connection to send data with larger amounts of changed data. When the amount of changed data increases, the likelihood of contiguous dirty chunks increases, and larger buffers provide the opportunity to send larger me/O's. Otherwise, the buffer size is never less than 64K, because it is the maximum granularity that Snap-View can track. The latency is used to determine the number of buffers to use as shown in table 2:

the Engine was asleep as shown in step 106. The timer will ensure the Engine doesn't sleep too long and waste bandwidth when an ACK is delayed due to slow processing at the Destination(s).

These values are preferably specified by the user: Available Link Bandwidth (for Link 13 of FIG. 1); Latency Granularity, Measured Latency; and Effective Bandwidth. Available Link Bandwidth is the available bandwidth for the copy session, which may be specified in Kbytes/sec on a per session basis. The user may specify the latency on a per session basis, typically in mess. In default auto mode, the SAN Copy driver measures the latency and uses this measured value. Values are then preferably returned to the user as Measured Latency. A measured latency in mess will be returned in a status request. In the preferred embodiment, the SAN Copy driver shall periodically measure the latency by sending out a write I/O for the next location. The SAN Copy driver calculates an effective bandwidth in Kbytes/sec to be returned in a status request.

TABLE 2

Bandwidth table

|  | High Bandwidth | Low Bandwidth |
|---|---|---|
| High Latency | Buffer Space = 2 * Line Capacity<br>Buffer Size = SAN Copy defaults.<br>Count = Buffer Space/Buffer Size<br>(Count is less than or equal to the SAN Copy defaults) | Buffer Size = 64K<br>Buffer Size < Line Capacity<br>Buffer Space = 2 * Line Capacity<br>Count = Buffer Space/Buffer Size<br>Buffer Size is approximately equal to the Line Capacity (within 5%)<br>Buffer Space = 3 * Line Capacity<br>Count = Buffer Space/Buffer Size<br>Buffer Size > Line Capacity<br>Buffer Space = 3 * Buffer Size<br>Count = 3 |
| Low Latency | Buffer size = SAN Copy default<br>Buffer Count = SAN Copy default | Buffer Size = 64K<br>Buffer Count = 3 |

For an Incremental session on a SAN, it may not be appropriate to take the SAN Copy defaults for the buffer size. This is because it may take too long for GetNext to fill a large buffer. This investigation shall continue as it amounts to tuning as opposed to being part of the design.

Figure 5:
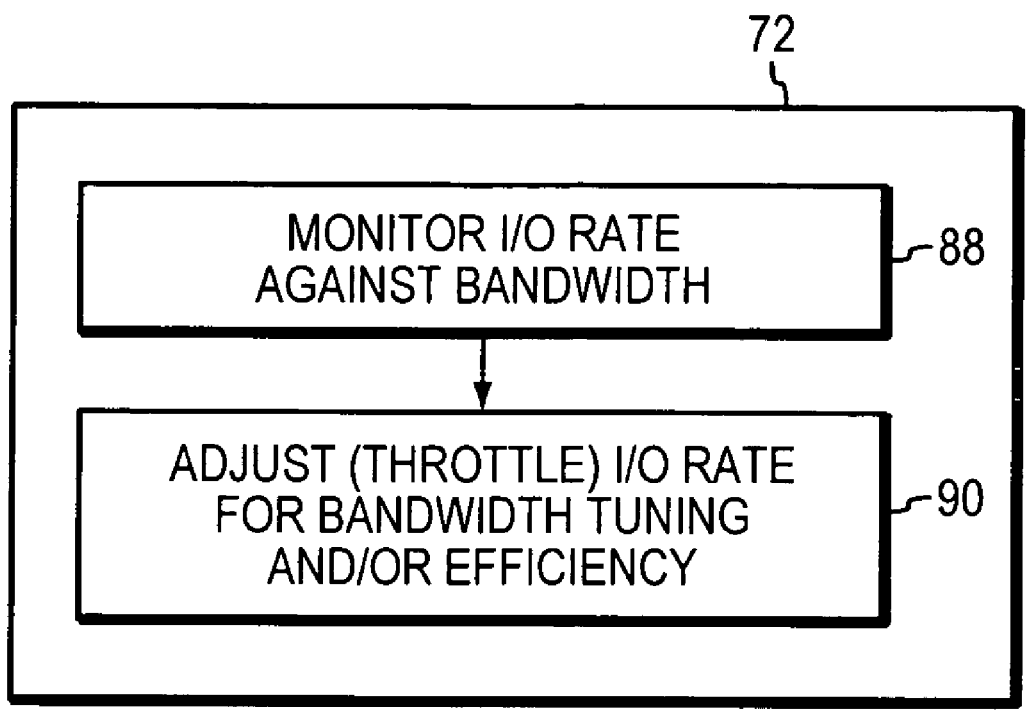
FIG. 5 shows a schematic of functions carried out by the copy engine of the copy manager a component of the copy manager depicted in FIGS. 2 and 3.
Figure 6:
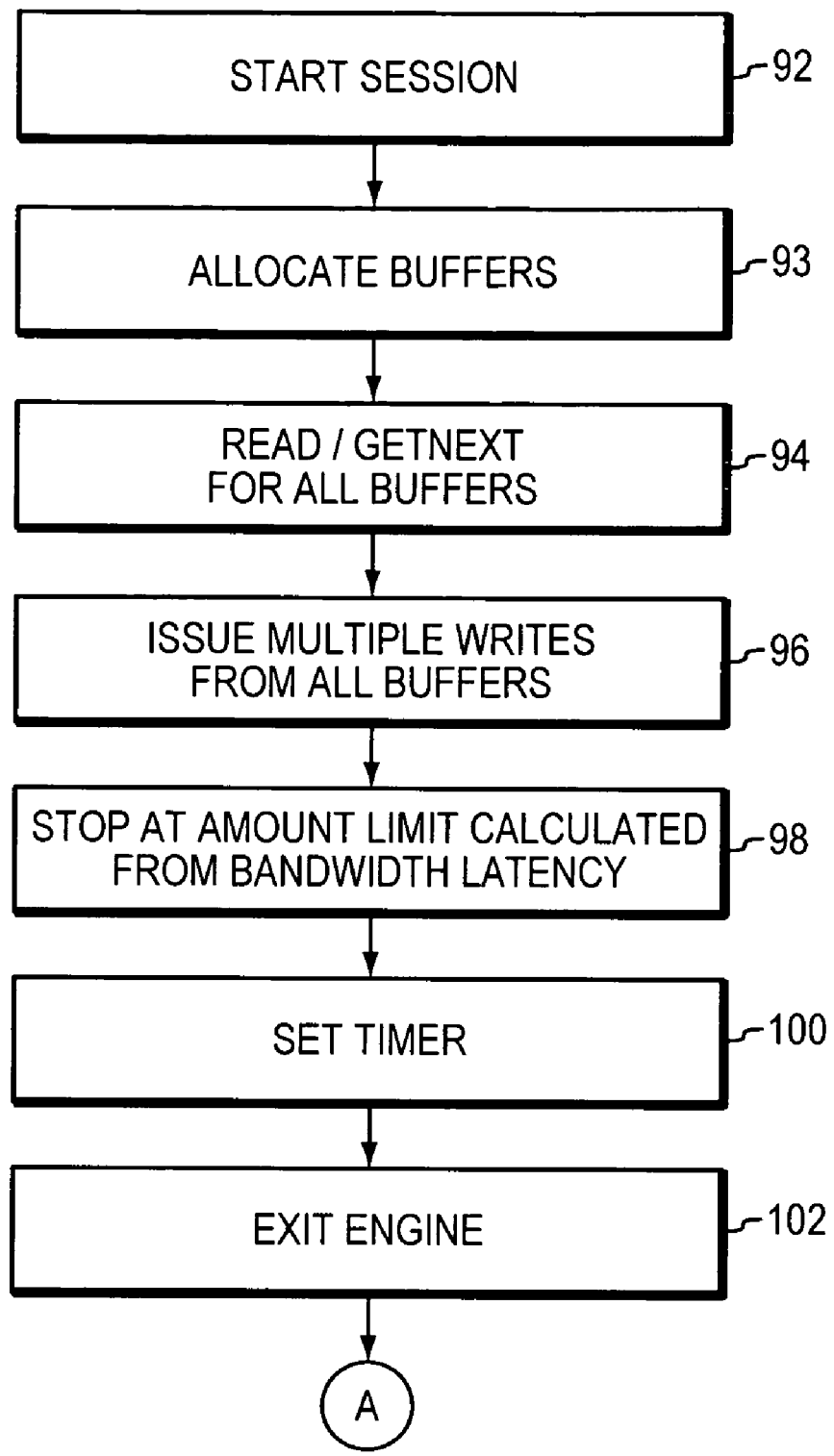
FIG. 6 shows a flow logic diagram of steps for carrying out method embodiments of the present invention employed by the copy manager.
Figure 7:
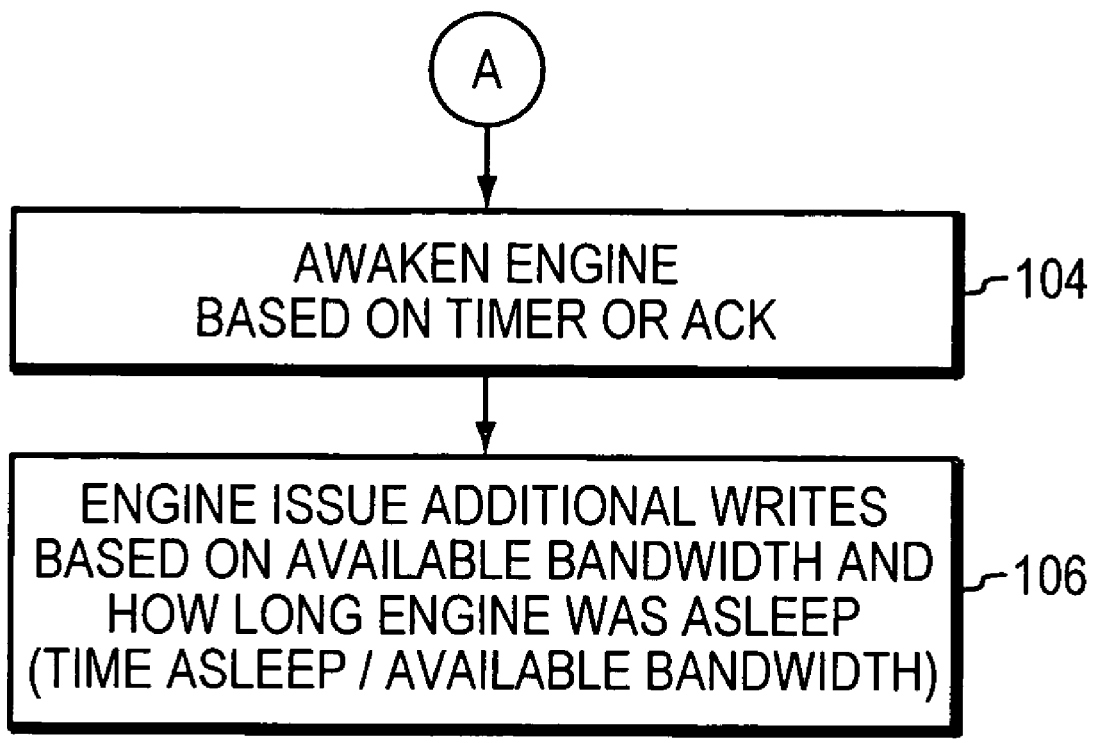
FIG. 7 shows another flow logic diagram of steps for carrying out method embodiments of the present invention using the program logic including the copy manager of FIGS. 2 and 3.

Referring to FIGS. 5-7, the Copy Engine 76 embodiment is now further described. The engine includes functionality for monitoring I/O rate against bandwidth shown in functional block 88, and adjusting or throttling the I/O rate for bandwidth tuning and/or efficiency shown in block 90. In general, it is a good choice for the user to specify the Available Bandwidth and Latency during the creation of a copy session. The Bandwidth value is required, but the user may choose to have SAN Copy measure the latency (default behavior). These two values shall then be used to calculate and allocate an optimal amount of Buffer Space for the Session.

Referring to FIG. 6, when the Session starts, GetNext or Read will be called for all buffers, shown in steps 92 and 94 (FIG. 6). As the GetNext/Reads return, multiple writes will be issued from each buffer as shown in step 96. This will continue up to a limited amount of write data calculated from the Available Bandwidth and Latency values as shown in step 98. A timer will be set and the Engine will exit as shown in steps 100 and 102. Continuation step A flows into FIG. 7.

In FIG. 7, in step 104, the Copy Engine will eventually be awakened by either the timer or an ACK from one of the outstanding writes. At that time, it will issue additional writes, in an amount based on the Available Bandwidth and how long The rate of issuing write data will be continuously varied in order to maintain the specified Available Bandwidth. This is done by issuing an amount of data up front which will keep the line busy at least long enough to allow an ACK to return from our first write. Then an interrupt from each ACK is awaited. The time between each interrupt may vary, but when the engine wakes up, it will calculate how long it was asleep, and issue an amount of data proportional to the sleep time and the Bandwidth. The basic formula is:

$$\text{Time Asleep} * \text{Available Bandwidth}$$

For example, if the engine woke after a second, and the bandwidth was 100 Kbytes/sec, we will issue 100 Kbytes worth of writes. (This formula is further refined below.)

Since it is possible for ACK's to be delayed, a timer (described below) is used to wake the engine up if too much time elapses without an ACK. Each time an ACK is received it resets the Timer, to ensure it doesn't go off unnecessarily generating excessive interrupts.

The GetNext data will contain varying I/O sizes, which often will not match the amount of data the engine needs to be sent when it wakes up. The engine will not break up these I/Os. Instead, it will always issue at least the amount of data calculated in the time/BW algorithm, and store this amount of excess data issued in a variable called "over/under count.

Sometimes the count may be negative. For example, there may not be enough data in the buffers to fulfill the amount of I/O required by the calculation. The use of the over/under count is described in the next section.

The basic formula from above is refined using the Over/Under Count as follows:

Data to Send=(Time Asleep*Available Bandwidth)−Over/Under Count

If the Maximum I/O size is approximately equal to the Line Capacity, there is the possibility of a "beat," where the ACK will usually come back at about the same time the timer expires, generating two interrupts very close together. This is minimized by artificially padding DTS to make it different from the Line Capacity.

Since the Maximum I/O size is equal to the Buffer Size, Buffer size is used in the calculations. The DTS is padded to increase the probability of receiving an ACK before the Timer expires. The formula is modified for this special case as follows.

If Buffer Size is within 5% of Line Capacity:

Data to Send=(Time Asleep*Bandwidth)−Over/Under+20% of Line Capacity.

The amount of data to pad is arbitrarily picked to be 20% of Line Capacity. This value shall be tuned as performance data becomes available.

The timer period is chosen to ensure that if the data is being transmitted at exactly the specified Bandwidth, the Timer will expire just when the last byte of outstanding data goes on the line. This ensures we get an opportunity to issue I/O and maintain the Available Bandwidth, without intervening "dead air," i.e., unused bandwidth.

Figures 8, 9:
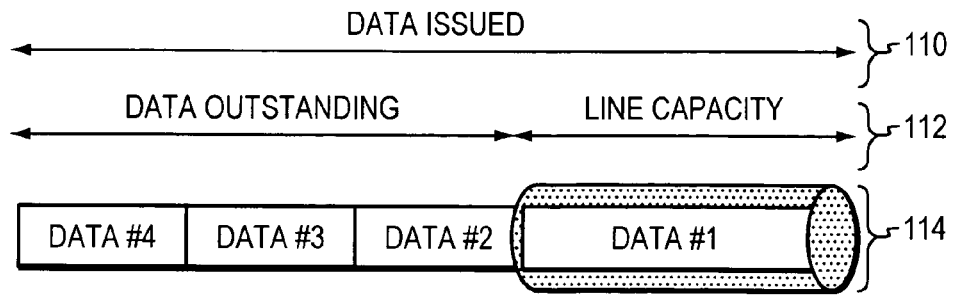
FIG. 8 shows a depiction of data issued in relationship to data outstanding and line capacity to illustrate bandwidth considerations handled by the copy manager of FIGS. 2 and 3.
FIG. 9 shows an exemplary depiction of other bandwidth considerations handled by the copy manager of FIGS. 2 and 3.

Reference will be made to FIG. 8 to discuss how the period is determined. It is calculated by the formula: Timer Period= (Data Outstanding/Bandwidth)+Data to Send. Where: Data Outstanding=(Amount of data sent but not ACK'ed)−(Line Capacity). This is illustrated by FIG. 8, wherein Data Issued is shown in line 110, while Data outstanding and Line Capacity is shown in line 112. For example, in the case shown in FIG. 8, line 114 shows that Data #4, Data #3, and Data #2 is Data Outstanding and Data #1 corresponds to the Line Capacity, i.e. it could be sent with the Bandwidth available and should be for efficient use of the Bandwidth.

FIG. 9 displays the buffer size and count chosen using the formula included herein for different bandwidths and latencies. The values in this Figure are calculated based on the assumptions below: High Bandwidth=Optical Cable band 3 (OC3) and higher; Low Latency=1 msec and lower; High Latency=50 msec (3000 miles), wherein Low Bandwidth 118 and High Bandwidth 120 are shown in the two respective regions bracketed on FIG. 9, with information regarding Type of Link, Approximate Bandwidth, Latency, Line Capacity, and Buffer size and Count using the above calculations shown in area 116 (the assumptions are based on choices, and one skilled in the art will realize such may be varied without limiting the scope of the invention). In the preferred environment, using the teachings discussed herein, it has been discovered that a good choice for a data storage environment using a local SAN and the preferred SAN Copy software is 4 buffers of a size of 512K each.

Having described a preferred embodiment of the present invention, it may occur to skilled artisans to incorporate these concepts into other embodiments. Nevertheless, this invention should not be limited to the disclosed embodiment, but rather only by the spirit and scope of the following claims and their equivalents.

What is claimed is:

1. In a data storage environment having a first data storage system and a second data storage system, and production data being stored on the first data storage system, and a copy of the data, denominated as the data copy, being stored on the second data storage system, a method for managing available bandwidth of a link used for movement of data being copied in a data storage environment, the method comprising the steps of:

obtaining, as a user input, available bandwidth and latency information for a link used for transferring data from the first data storage system to the second storage system; wherein the link has a bandwidth and latency and the available bandwidth and latency obtained are less then bandwidth and latency of the link to reduce the performance impact on the link of accessing production data for copying and replication; and determining an amount of data buffer space in a data buffer based on the obtained bandwidth and latency information, on the first data storage system, to accommodate a rate of data transfer used for transferring data from the first data storage system to the second storage system;

filling the data buffer space with data from the first data storage system;

issuing, from a copy engine, a select number of writes from the data buffer space to the second data storage system over the link, the number of writes selected according to the bandwidth and latency of the link, and including writes for less than all of the data buffer space;

setting a timer, on the first data storage system, based on the amount of time to transmit the data in the data buffer based on the available bandwidth from the first data storage system to the second data storage system of the copy engine after issuing the select number of writes; and responsive to the timer issuing a trigger associated with the period of inactivity, and prior to receipt of an acknowledgement from the second data storage system, issuing additional writes from the data buffer space to the second data storage system to use more of the available bandwidth.

2. The method of claim 1, wherein data buffers are written with data to be transferred to an amount calculated in accordance with bandwidth and latency information.

3. The method of claim 1, wherein the bandwidth information is provided as a user input.

4. The method of claim 3, wherein the latency information is provided as a user input.

5. The method of claim 3, wherein the latency information is measured.

6. A system for managing available bandwidth for a link used for movement of data being copied in a data storage environment, the system comprising:

a first data storage system and a second data storage system, and production data being stored on the first data storage system, and a copy of the data, denominated as the data copy, being stored on the second data storage system, wherein a network link between the first and second data storage systems is available for data transfer when data is being copied from the first data storage system to the second data storage system;

computer-executable program code operational with the first data storage system for enabling the method steps of:

obtaining, as a user input, available bandwidth and latency information for a link used for transferring data from the first data storage system to the second storage system; wherein the link has a bandwidth and latency and the available bandwidth and latency obtained are less then bandwidth and latency of the link to reduce the performance impact on the link of accessing production data for copying and replication;

determining an amount of data buffer space in a data buffer based on the obtained bandwidth and latency information, on the first data storage system, to accommodate a rate of data transfer used for transferring data from the first data storage system to the second storage system;

filling the data buffer space with data from the first data storage system;

issuing, from a copy engine, a select number of writes from the data buffer space to the second data storage system over the link, the number of writes selected according to the bandwidth and latency of the link, and including writes for less than all of the data buffer space;

setting a timer, on the first data storage system, based on the amount of time to transmit the data in the data buffer based on the available bandwidth from the first data storage system to the second data storage system inactivity of the copy engine after issuing the select number of writes; and responsive to the timer issuing a trigger associated with the period of inactivity, and prior to receipt of an acknowledgement from the second data storage system, issuing additional writes from the data buffer space to the second data storage system to use more of the available bandwidth.

7. The system of claim 6, wherein data buffers are written with data to be transferred to an amount calculated in accordance with bandwidth and latency information.

8. The system of claim 6, wherein the bandwidth information is provided as a user input.

9. The system of claim 8, wherein the latency information is provided as a user input.

10. The system of claim 8, wherein the latency information is calculated.

11. A program product for managing available bandwidth for a link used for movement of data being copied in a data storage environment, wherein the data storage environment includes a first data storage system and a second data storage system, and production data being stored on the first data storage system, and a copy of the data, denominated as the data copy, being stored on the second data storage system, wherein the network link between the first and second data storage system is available for data transfer when data is being copied from the first data storage system to the second data storage system, and the program product comprises:

a computer-readable medium operational with the first data storage system and encoded with computer-executable program code for enabling the method steps of:

obtaining, as a user input, available bandwidth and latency information for a link used for transferring data from the first data storage system to the second storage system; wherein the link has a bandwidth and latency and the available bandwidth and latency obtained are less then bandwidth and latency of the link to reduce the performance impact on the link of accessing production data for copying and replication;

determining an amount of data buffer space in a data buffer, on the first data storage system based on the obtained bandwidth and latency information, to accommodate a rate of data transfer used for transferring data from the first data storage system to the second storage system;

filling the data buffer space with data from the first data storage system;

issuing, from a copy engine a select number of writes from the data buffer space to the second data storage system over the link, the number of writes selected according to the bandwidth and latency of the link, and including writes for less than all of the data buffer space;

setting a timer based on the amount of time to transmit the data in the data buffer based on the available bandwidth from the first data storage system to the second data storage system of inactivity of the copy engine after issuing the select number of writes; and responsive to the timer issuing a trigger associated with the period of inactivity, and prior to receipt of an acknowledgement from the second data storage system, issuing additional writes from the data buffer space to the second data storage system to use more of the available bandwidth.

12. The program product of claim 11, wherein data buffers are written with data to be transferred to an amount calculated in accordance with bandwidth and latency information.

13. The program product of claim 11, wherein the bandwidth information is provided as a user input.

14. The program product of claim 13, wherein the latency information is provided as a user input.

15. An apparatus for managing available bandwidth for a link used for movement of data being copied in a data storage environment, wherein the data storage environment includes a first data storage system and a second data storage system, and production data being stored on the first data storage system, and a copy of the data, denominated as the data copy, being stored on the second data storage system, wherein the network link between the first and second data storage system is available for data transfer when data is being copied from the first data storage system to the second data storage system, and the apparatus comprises:

means for obtaining, as a user input, available bandwidth and latency information for a link used for transferring data from the first data storage system to the second storage system; wherein the link has a bandwidth and latency and the available bandwidth and latency obtained are less then bandwidth and latency of the link to reduce the performance impact on the link of accessing production data for copying and replication; and means for determining an amount of data buffer space in a data buffer based on the obtained bandwidth and latency information, on the first data storage system, to accommodate a rate of data transfer used for transferring data from the first data storage system to the second storage system;

means for filling the data buffer space with data from the first data storage system;

copy engine for issuing a select number of writes from the data buffer space to the second data storage system over the link, the number of writes selected according to the bandwidth and latency of the link, and including writes for less than all of the data buffer space;

means for setting a timer, on the first data storage system, based on the amount of time to transmit the data in the data buffer based on the available bandwidth from the first data storage system to the second data storage system of inactivity of the copy engine after issuing the select number of writes; and responsive to the timer issuing a trigger associated with the period of inactivity, and prior to receipt of an acknowledgement from the second data storage system, means for issuing additional writes from the data in the data buffer based on the available bandwidth to the second data storage system to use more of the available bandwidth.

* * * * *